United States Patent [19]
Brandauer

[11] Patent Number: 5,697,523
[45] Date of Patent: Dec. 16, 1997

[54] CONTAINER WITH A FLEXIBLE INTERNAL MEMBER AND MULTIPLE OUTLETS FOR WEIGHING BULK MATERIAL

[75] Inventor: Otto Brandauer, Muehlacker, Germany

[73] Assignee: Filterwerk Mann & Hummel GmbH, Ludwigsburg, Germany

[21] Appl. No.: 561,620

[22] Filed: Nov. 21, 1995

[51] Int. Cl.$^6$ ............................................. B67D 5/08
[52] U.S. Cl. .................. 222/58; 222/77; 222/203; 222/481; 222/504; 222/529; 141/248; 141/279
[58] Field of Search ..................... 177/116, 122, 177/123, 160; 141/234, 235, 248, 279, 284; 222/55, 56, 58, 77, 105, 96, 198, 200, 203, 181.2, 181.3, 185.1, 504, 488, 527, 529, 537, 559, 481

[56] References Cited

U.S. PATENT DOCUMENTS

| | | |
|---|---|---|
| 3,308,898 | 3/1967 | Allen et al. |
| 4,137,915 | 2/1979 | Kamen ............................ 222/58 |
| 4,944,428 | 7/1990 | Gmur et al. ..................... 222/77 |
| 5,127,483 | 7/1992 | Hough. |
| 5,322,195 | 6/1994 | Ellis ................................. 222/504 |

FOREIGN PATENT DOCUMENTS

| | | |
|---|---|---|
| 3626304 | 2/1988 | Germany. |
| 88 14 229 | 2/1989 | Germany. |

*Primary Examiner*—Philippe Derakshani
*Attorney, Agent, or Firm*—Evenson, McKeown, Edwards & Lenahan P.L.L.C.

[57] ABSTRACT

A container or hopper with a flexible weigh container as an inner member, in which the weigh container is supported through at least one weigh cell on a frame. In order to weigh-in a material to be proportioned, a throttling device is provided at the bottom end of the weigh container. To avoid complicated distributing arrangements and assure precise dosing, the flexible weigh container extends further downwardly like a hose through the throttling device and its bottom is attached to a movable spout which in turn is displaceable in such a manner that the flexible, hose-like extension of the weigh container is carried along with it so as to selectively discharge through different outlets of the container or hopper.

7 Claims, 1 Drawing Sheet

CONTAINER WITH A FLEXIBLE INTERNAL MEMBER AND MULTIPLE OUTLETS FOR WEIGHING BULK MATERIAL

BACKGROUND OF THE INVENTION

The invention relates to a container or hopper for receiving a bulk material, said container being mounted on a frame through at least one weigh-cell and comprising a flexible internal member with a bottom outlet and a throttling device adjacent the bottom of the internal member to close the outlet.

Hoppers for proportioning apparatus are already known, in which a flexible weigh container is made as an inner part, along with a chute system made of a highly wear-resistant plastic and/or rubber material. In the processing of bulk materials, for example polyvinyl chloride (PVC), mixtures must often be formed which consist of precisely specified amounts of the components. The precise weighing and complete filling and emptying of the proportioning apparatus are essential to high product quality.

It is furthermore known in the art to use mixers which operate discontinuously in conjunction with the weighing of containers to form the bulk material mixture. In this container weighing, all of the components of a particular bulk-material formula are weighed separately. In addition to the precise proportioning of the components, it is of decided importance that the components weighed out, as mentioned above, are discharged entirely from the container cell. Particularly in the case of fine grained powder or very sticky components, flexible weigh containers are easier to empty, unlike metal or other rigid containers, since it is virtually impossible for material to cake or stick to the flexible container walls due to the movements of the flexible weighing container.

In the known proportioning apparatus the components weighed out are fed as a rule by free fall into one or more mixers, and the necessary outlet conduits can also be made flexible for the reasons described above. When more than one mixer is used it is therefore necessary underneath the outlet from the weigh container to provide spreading means in the form of hinged valves or tube switches which, due to their relatively complex mechanical construction, with the accompanying need for additional structural height, are as a rule made of metal. It is a disadvantage in this case that a more or less great deflection of the stream of the material is produced, which promotes the caking or sticking of bulk material to the spreading means.

SUMMARY OF THE INVENTION

It is the object of the invention to provide an improved container or hopper with a flexible internal member for a proportioning apparatus which has a simple construction.

Another object of the invention is to provide a container or hopper with a flexible internal member for a proportioning apparatus which assures trouble-free feeding of at least two systems.

These and other objects have been achieved in accordance with the present invention by providing a container for receiving a bulk material, the container being mounted on a container frame through at least one weigh-cell and comprising a flexible internal member with a bottom outlet and a throttling device adjacent the bottom of the internal member to close the outlet, wherein the flexible internal member is hose-like and extends downwardly through the throttling device and is attached at its bottom to a movable spout, the spout being selectively displaceable to positions above a plurality of different outlets such that the flexible, hose-like extension of the internal member is carried with it so as to discharge through a respective one of the outlets depending on the position of the spout.

It is especially beneficial in the container or hopper according to the invention that the advantages gained by the use of flexible internal members as weigh containers are retained and result in an additional simplification of mechanical distributing processes, for example in proportioning apparatus. With the hose-like extension through the throttling device of the weigh containers a flexible and easy-to-operate distributing arrangement is created at the outlet of the hopper, which can be manufactured at reasonable cost, and is furthermore easy to replace.

In the further preferred embodiments of the hopper according to the invention that are described hereinafter, the spout can be shifted together with the outlet of the flexible weigh container as an internal part.

It is a particular advantage that the necessary movements in the hopper are performed by means of pneumatic cylinders, which permit a very precise and reliable positioning of the spout as well as simple operation of the throttling means. In addition the flexible weigh container can be shaken so as to assure that the container is entirely empty.

BRIEF DESCRIPTION OF THE INVENTION

The invention will be described in further detail hereinafter with reference to illustrative preferred embodiments depicted in the accompanying drawing figures in which:

FIG. 1 is a cross-sectional view of a proportioning apparatus in the form of a hopper with a flexible internal member as the weigh container and a flexible distributing system, and FIG. 2 is a sectional view through the weigh container in the course of an emptying of the proportioning apparatus.

DETAILED DESCRIPTION OF PREFERRED EMBODIMENTS

Figure 1:
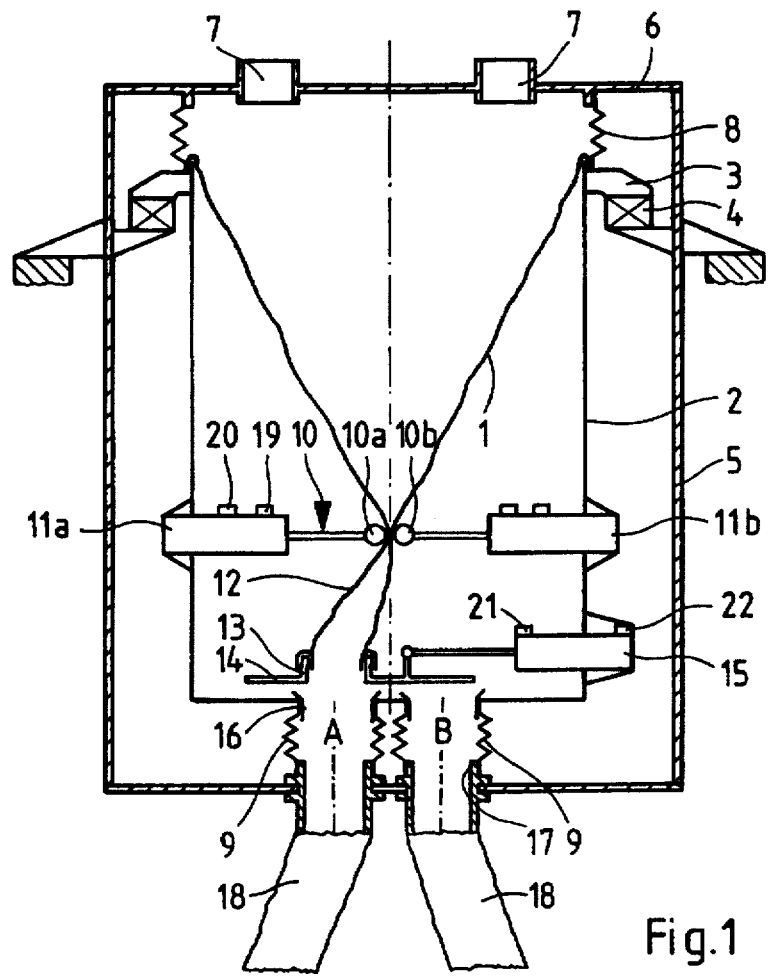

FIG. 1 shows a flexible weigh container 1 as the inner part of a hopper, in which the weigh container 1 is suspended on a fixed weigh frame 2 made, for example, of metal. In this embodiment, the weigh frame 2 is attached or mounted by three feet 3 on three weigh cells 4. The weigh cells 4 are affixed to a container frame 5 which together with a cover 6 represents the outer shell of the entire hopper, which is used, for example, as a proportioning apparatus.

In the cover 6, which preferably is made of metal, there are inlet connections 7 for the bulk material components, through which this material is delivered and then stops in the weigh container 1. A dust-proof and flexible connection between the container frame 5 and the weigh frame 2 is provided by flexible sleeves 8 in the inlet area and likewise flexible sleeves 9 in the outlet area. This hopper is charged in a known manner with the material to be proportioned, by means of screw conveyors or metering chutes.

In order to determine the weight of the bulk material, the weigh container 1 is closed by a throttling device 10. This throttling device 10 comprises two rollers 10a and 10b which are mounted on pistons of pneumatic cylinders 11a and 11b. With these pneumatic cylinders 11a and 11b, the rollers 10a and 10b can be moved horizontally, resulting in the closing or in the opening of the throttling device 10.

At the bottom outlet of the weigh container 1 there is a flexible tubular extension 12 which is clamped to a movable spout 13. This spout 13 is mounted on a displaceable plate 14 or is a component of this plate 14. Plate 14 is mounted on a piston of another pneumatic cylinder 15 and can be shifted by the pneumatic cylinder into one position A or into another position B and locked in these positions. The positions A and B are associated with different outlet openings 16 in the weigh frame 2, these being flexibly connected via the sleeves 9 to the outlets 17 of the container frame 5 and the tubes 18. These tubes 18 lead to mixing apparatus not shown in this drawing figure.

Instead of the spout being mounted on a transversely displaceable plate or on the end of the piston of a pneumatic cylinder, the spout may also be mounted on a rotatable plate which can be selectively positioned in at least two given outlet positions, each of which is associated with a different outlet.

When the bulk material is weighed in, the pneumatic cylinders 11a and 11b are in the extended state and close the flexible weigh container 1 with rollers 10a and 10b, so that no bulk material can escape. The spout 13 is in this case in one of the positions A or B depending on the preset formula. The position of the spout 13 and movable plate 14 is detected through proximity indicators 21 and 22 mounted on pneumatic cylinder 15. After the weighing is completed the weigh container 1 is emptied by moving the rollers 10a and 10b away from container 1.

Figure 2:
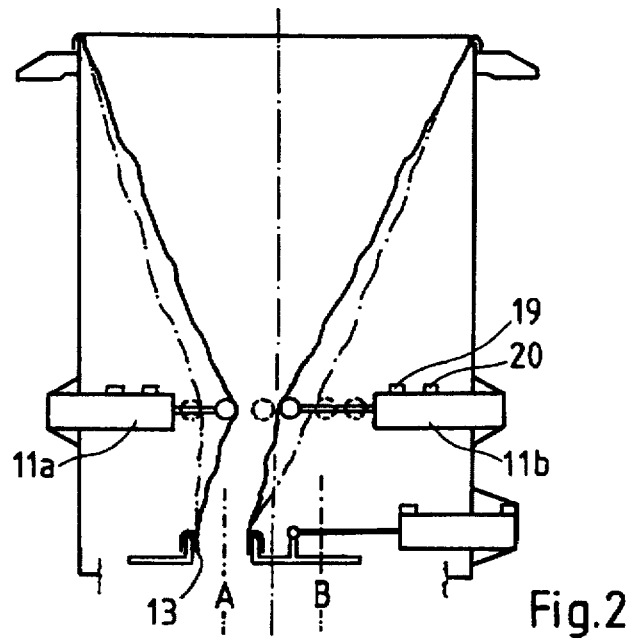

To clarify the dumping procedure reference is made to FIG. 2, in which the reciprocating movement of the rollers 10a and 10b is illustrated. The two pneumatic cylinders 11a and 11b are activated such that they are moved back and forth repeatedly between the extreme retracted position and a middle position (illustrated by pneumatic cylinder 11a) as well as the extreme extended position and a middle position (illustrated by pneumatic cylinder 11b).

FIG. 2 shows how the bulk material is discharged in position A, whereas after the nozzle 13 is shifted to position B a mode of procedure adapted accordingly is performed in the shaking. Accordingly, the pneumatic cylinder adjacent to the selected outlet is not shifted to the fully extended position, and the opposite pneumatic cylinder is not shifted to the fully retracted position.

The positions of the pneumatic cylinders 11a and 11b are detected by proximity indicators 19 and 20, the signals emitted by these proximity indicators 19 and 20 being processed in a conventional control unit which is not shown in the drawing. This shaking or vibrating of the flexible weigh container 1 thus prevents, or immediately breaks up, any caking of the material on the container walls and assures a continuous flow of the material.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A container for receiving a bulk material, said container being mounted on a container frame through at least one weigh-cell and comprising a flexible internal member with a bottom outlet and a throttling device adjacent the bottom of the internal member to close the outlet, wherein the flexible internal member is hose-like and extends downwardly through the throttling device and is attached at its bottom to a movable spout, the spout being selectively displaceable to positions above a plurality of different outlets such that the flexible, hose-like extension of the internal member is carried with it so as to discharge through a respective one of the outlets depending on the position of the spout.

2. A container according to claim 1, wherein the movable spout is mounted on a transversely displaceable plate which can be selectively positioned in at least two given outlet positions, each of which is associated with a different outlet.

3. A container according to claim 1, wherein the movable spout is mounted on a rotatable plate which can be selectively positioned in at least two given outlet positions, each of which is associated with a different outlet.

4. A container according to claim 1, wherein the movable spout is mounted on a piston of a pneumatic cylinder which is actuated to displace the spout.

5. A container according to claim 1, wherein the throttling device is actuatable through at least two pneumatic cylinders, and wherein the pneumatic cylinders vibrate the flexible internal member when the throttling device is opened.

6. A container according to claim 5, further comprising proximity indicators for detecting the positions of pistons of the pneumatic cylinders.

7. A container according to claim 1, wherein the flexible internal member is mounted in a weigh frame, and the weigh frame is connected at an upper end thereof and at the each of the plurality of outlets via flexible sleeves to the container frame.

* * * * *